(12) United States Patent
Tyler (10) Patent No.: US 9,963,090 B2
(45) Date of Patent: May 8, 2018

(54) SEWAGE DRAIN TUBE CAP

(71) Applicant: Dustin Tyler, Des Moines, IA (US)

(72) Inventor: Dustin Tyler, Des Moines, IA (US)

( * ) Notice: Subject to any disclaimer, the term of this patent is extended or adjusted under 35 U.S.C. 154(b) by 272 days.

(21) Appl. No.: 14/257,272

(22) Filed: Apr. 21, 2014

(65) Prior Publication Data

US 2015/0298624 A1  Oct. 22, 2015

(51) Int. Cl.
*B60R 15/04*    (2006.01)

(52) U.S. Cl.
CPC .................................. *B60R 15/04* (2013.01)

(58) Field of Classification Search
USPC ......... 138/89, 96 R; 220/837, 802, 803, 804, 220/805, 375, 254.7, 259.5
See application file for complete search history.

(56) References Cited

U.S. PATENT DOCUMENTS

| | | | |
|---|---|---|---|
| 3,160,327 A * | 12/1964 | Porcelli | B65D 47/103 220/258.2 |
| 3,282,477 A * | 11/1966 | Henchert | B65D 47/103 220/258.2 |
| 3,525,366 A * | 8/1970 | De Frees | F16L 55/1152 138/109 |
| 3,799,426 A * | 3/1974 | Pates | B65D 41/02 220/270 |
| 3,854,618 A * | 12/1974 | Beghnini | B65D 47/0842 215/307 |
| 3,899,117 A | 8/1975 | Peyser et al. | |
| 3,998,354 A * | 12/1976 | Song | B65D 39/04 220/254.7 |
| 4,000,839 A * | 1/1977 | Tecco | B65D 50/067 215/321 |
| 4,475,654 A * | 10/1984 | Fruchter | A61J 1/03 206/457 |
| D281,873 S | 12/1985 | Milton | |
| 4,754,895 A * | 7/1988 | Lardner | A61F 5/4405 220/288 |
| 4,827,539 A * | 5/1989 | Kiziah | E03D 11/16 285/303 |
| 4,979,843 A | 12/1990 | Perry | |
| 5,225,165 A * | 7/1993 | Perlman | B01L 3/5021 206/815 |
| 5,271,519 A * | 12/1993 | Adams | B65D 5/749 215/216 |
| 5,588,853 A * | 12/1996 | Anthony | H01R 13/5213 220/375 |
| 5,657,792 A * | 8/1997 | Prest | F16L 55/1152 138/89 |
| 5,657,894 A * | 8/1997 | Bowen | B65D 43/169 220/254.3 |
| 5,829,592 A | 11/1998 | Henry, Jr. et al. | |

(Continued)

*Primary Examiner* — James Hook
(74) *Attorney, Agent, or Firm* — McKee, Voorhees & Sease, PLC (57) ABSTRACT

A cap provided for use in capping a sewage drain tube of a vehicle and/or opening where a sewage drain tube is located. The sewer drain cap includes a chamber with a lid, useful for storage. Apertures to allow air flow or ventilation and to aid in removal and replacement of the sewer drain cap are provided. A sealing member for the drain tube cap is also provided for attaching to and/or sealing a drain tube and/or opening where a sewage drain tube is located.

20 Claims, 13 Drawing Sheets

(56) References Cited

U.S. PATENT DOCUMENTS

| | | | |
|---|---|---|---|
| 6,085,362 A * | 7/2000 | Huber | E03D 11/16 138/96 R |
| 6,240,986 B1 | 6/2001 | Berkes et al. | |
| D446,771 S | 8/2001 | Bosatelli | |
| 6,468,147 B1 | 10/2002 | Thomas | |
| D481,679 S | 11/2003 | Garver | |
| 7,722,091 B1 | 5/2010 | Brockington et al. | |
| D634,450 S | 3/2011 | Stover | |
| D642,054 S | 7/2011 | Samartgis | |
| D655,158 S | 3/2012 | Drozek et al. | |
| 8,465,059 B1 | 6/2013 | Price et al. | |
| 2008/0265229 A1 | 10/2008 | DiMartino | |
| 2009/0236001 A1* | 9/2009 | Damaske | B60R 15/00 137/899 |
| 2012/0037553 A1* | 2/2012 | Silverstein | E03F 5/0407 210/163 |
| 2013/0105481 A1* | 5/2013 | Sawicki | B65D 43/169 220/270 |

\* cited by examiner

SEWAGE DRAIN TUBE CAP

FIELD OF THE INVENTION

The invention relates to sewage drain tube caps, in particular sewage drain tube caps for recreational vehicles, motor homes, campers and other vehicles having sewage drain tubes.

BACKGROUND OF THE INVENTION

Many types of recreational vehicles (RVs), motor homes, campers and other vehicles have lavatories, including sinks and toilets. Such vehicles require sewage tanks and are drained, typically by sewage drain tubes. Such sewage drain tubes can be located in various parts of the vehicle, generally in an opening, compartment, or cavity that can be capped by a sewage drain tube cap. Most sewage drain tube caps are designed to be removed, replaced, and adjusted by hand. As the sewage drain tube is used to drain sewage including human excrement, the handling of the sewage drain tube, draining of the sewage, and replacement of the sewage drain tube cap gives rise to many sanitary and hygiene concerns. It is typical for people to remove the sewage drain cap with their bare hands, which is unsanitary. In addition, some types of caps may require additional tools, equipment, or other items to aid in removing the caps. In some cases, people may be found to use reusable gloves, which is actually more unsanitary than using bare hands, as the gloves will accumulate bacteria and germs. In other cases, people may be found to be using disposable gloves to remove the sewage drain tube cap, drain the sewage tank, and replace the sewage drain tube cap. However, in such instances, people will need to remember to keep disposable gloves somewhere with them or in the vehicle and then must remember to bring the gloves with them when they are going to drain the sewage tank. This can be a hassle, inconvenience, and can be subject to the person's forgetfulness. Moreover, if a person is going to empty the sewage tank, they may not be aware that another person has stored gloves somewhere in the vehicle. Thus, there is a need to have a convenient and readily accessible storage chamber that can contain disposable gloves and other equipment to aid in the draining of the sewage tanks near the sewage drain tube for sanitary reasons, hygiene, and convenience.

Accordingly, it is an object, feature, and/or advantage of the present invention to provide a chamber within or affixed to the sewage drain tube cap.

Another objective, feature, and/or advantage of the present invention is to provide a sewage drain tube cap that facilitates sanitary draining of a sewage tank.

Still a further objective, feature, and/or advantage of the present invention is to provide a sewage drain tube cap that has a storage location for gloves that is hassle-free and convenient.

Yet another objective, feature, and/or advantage of the present invention is to provide a sewage drain tube cap that is easy to grasp and remove by hand.

These and/or other objects, features, and advantages of the present invention will be apparent to those skilled in the art. The present invention is not to be limited to or by these objects, features and advantages. No single embodiment need provide each and every object, feature, or advantage.

SUMMARY OF THE INVENTION

According to an aspect of the invention a sewage drain cap is provided that provides a chamber within the sewage drain tube cap, wherein the sewage drain tube cap includes a main surface; a chamber having an open end and a closed end, wherein said open end of said chamber is oriented at or near said main surface, and wherein said chamber extends from said main surface; and a lid that covers, shields, or stoppers the open end of the chamber.

In another aspect of the invention, the sewer drain tube cap includes a linkage that operatively connects the lid and the surface of the sewer drain tube cap. In a preferred embodiment, the linkage is integrated into the lid, the surface of the sewer drain tube cap, or both. In another embodiment, the linkage is composed of a cable, cord, chain, or similar mechanism that is attached to a linkage member on the lid and a linkage member on the surface of the sewage drain tube cap.

In another aspect, the sewage drain tube cap includes one or more apertures in the surface of the sewage drain tube cap. The aperture or apertures are configured to provide air flow and/or venting in the sewage drain tube cap and/or to provide improved grip on the sewage drain tube cap for removal and replacement.

DETAILED DESCRIPTION OF THE PREFERRED EMBODIMENTS

It is to be understood that the embodiments of the present invention are not limited to particular sewage drain tubes and/or the openings, compartments, or cavities where sewage drain tubes are kept, which can vary. Thus, the shapes, sizes, configurations, etc. of the caps for sewage drain tubes of the invention may be varied or otherwise changed to account for the various sewage drain tubes and/or the openings, compartments, or cavities where sewage drain tubes are kept for use therewith. In particular embodiments of the invention, the drain tube cap may be configured to attach to or fit within openings, compartments, or cavities where sewage drain tubes are located, particularly on vehicles carrying sewage and/or storing sewage, including, but not limited to, RVs, campers, motor homes, airplanes, trains, sewage trucks, septic tank trucks, or other vehicles, recreational or otherwise, that have a sewage drain tube.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

The terms "opening", "compartment", and "cavity" are used interchangeably herein to refer to a space defined by at least four sides that is configured to contain or provide access to a drain tube. Further, the opening, compartment, or cavity of the present invention is configured to allow the attachment or affixing of a cap. Examples of opening, compartments, or cavities are provided in U.S. Pat. No. 8,672,371, which is incorporated herein in its entirety.

As used herein, the term "chamber" refers to the space within or defined by drain tube cap. The chamber can be operably connected to a cap or plug. The chamber provides a space within or attached to the drain tube cap, inside of which items can be stored.

Referring to FIGS. 1-6 and 13-16, a drain tube cap is generally designated by the numeral 10. The drain tube cap 10 includes a main surface 12 having a chamber 30 extending from the main surface 12. A sealing member 14 may also be included as part of the cap 10. The chamber 30 has an open end 32 (shown in FIGS. 1-5, 14, and 16) and a closed end 36 (shown in FIGS. 1-4, 6, 13, 14, and 16). In the particular configuration shown in FIGS. 1-6, the chamber 30 is cylindrical, but it is to be understood that it can be any shape, including, for example, but not limited to, rectangular, circular, star-shaped, ovular, or the like. The sealing member 14 aids in sealing and/or affixing the sewage drain tube cap 10 to the opening, compartment, or cavity where a drain tube is located by attaching to or providing a fit into the opening, compartment, or cavity. In an embodiment of the invention, the sealing member 14 extends from the drain tube cap 10, as shown in FIGS. 1-4 and 13-16. The sealing member 14 is configured to attach to and/or seal an opening, compartment, or cavity where a sewage drain tube is located. The sealing member 14 can be configured to improve its seal of the opening, compartment, or cavity where a sewage drain tube is located, in such a configuration, the sealing member may be tapered, ribbed, grooved, or any other configuration that improves the seal or stability of the drain tube cap 10 with the opening, compartment, or cavity where a sewage drain tube is located. Additionally, gaskets, such as rubber gaskets, may be used with the sealing member 14 to further aid in sealing or attaching to the, opening compartment, or cavity where a sewage drain tube is located.

The chamber 30 can be any shape and/or size. In some embodiments of the invention, the chamber 30 is large enough to store at least one set of disposable gloves. In further embodiments of the invention, the chamber is large enough to store at least five sets of disposable gloves, or at least ten sets of disposable gloves. In particular embodiments, the chamber 30 may be of a size to store any particular item. In addition, the chamber 30 may be sized to hold additional items, such as keys or tools for use both with the drain cap 10, as well as other aspects of the vehicle. Those of skill in the art will be able to ascertain and create a chamber of a desired size and shape.

In some embodiments of the invention, the drain tube cap 10 has at least one aperture 18. In further embodiments, the drain tube cap 10 has at least two apertures 18. In yet a further embodiment, the drain tube cap 10 has a plurality of apertures 18. A particular configuration of the drain tube cap 10, having two apertures is shown in FIGS. 1, 5, 6, and 13-15. The apertures 18 can provide air flow and/or venting. The apertures 18 can be located to provide improved grip on the drain tube cap 10 for removal and replacement of the drain tube cap 10. A non-limiting example of such a configuration is shown in FIGS. 1, 5, 6, and 13-15. The apertures 18 may include a screen, meshing, perforations, bars, or other configuration to permit airflow while preventing bugs, insects, or small debris from entering the drain tube.

Figure 1:
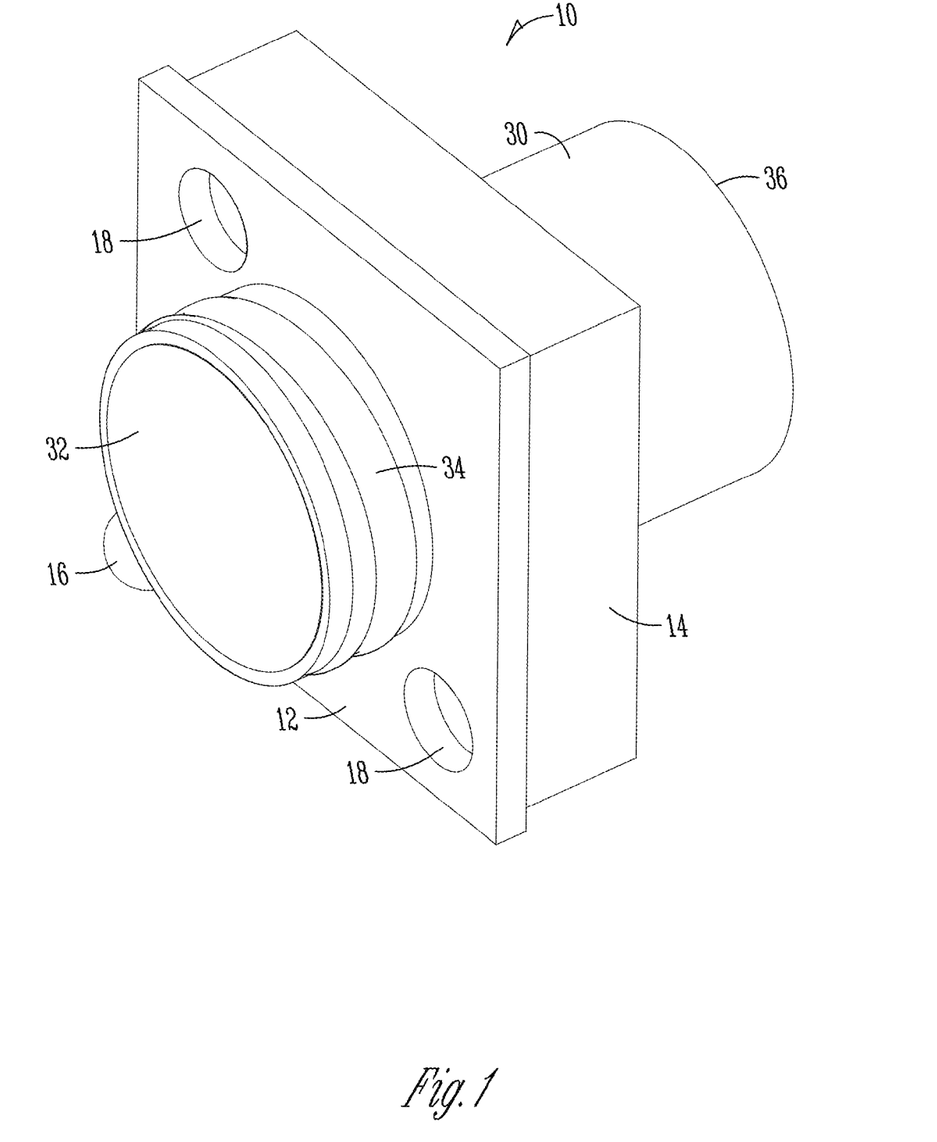
FIG. 1 is a perspective view of an embodiment of the drain tube cap without the lid in place, such that the chamber is open.
Figure 2:
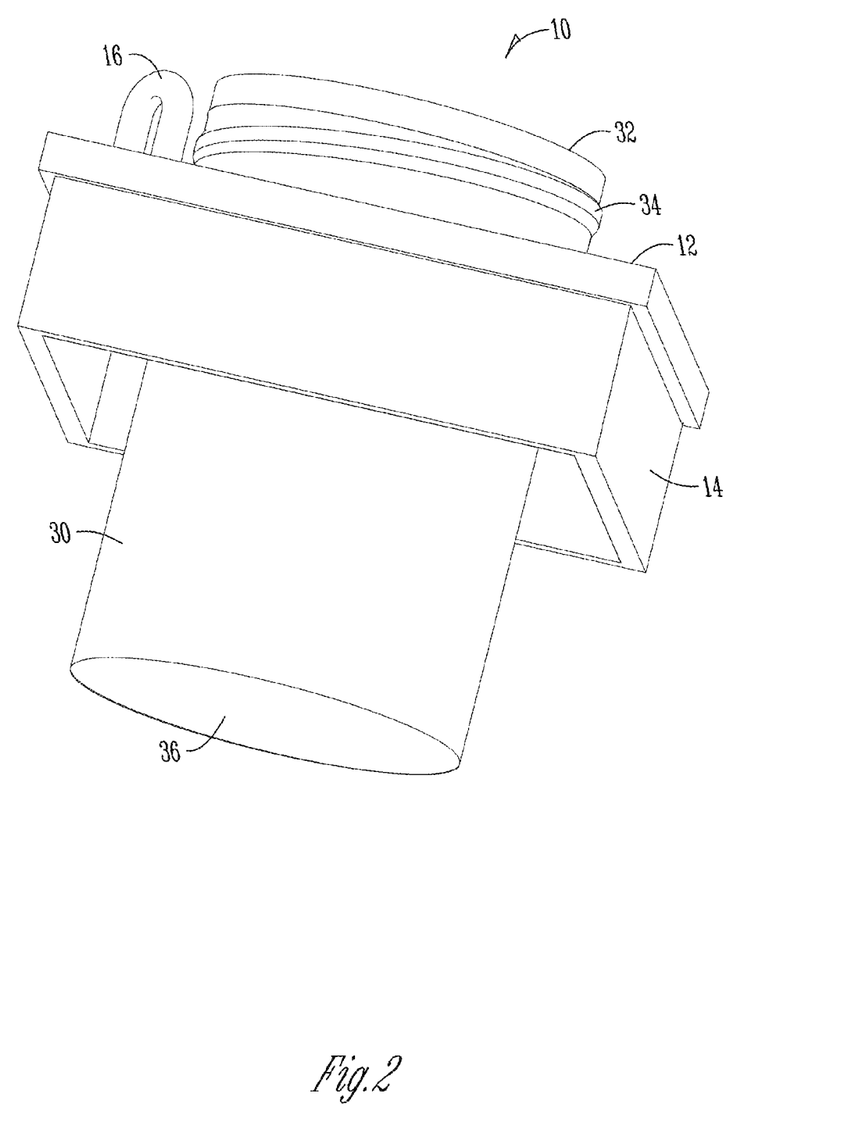
FIG. 2 is a perspective view of an embodiment of the drain tube cap without the lid in place, such that the chamber is open.
Figure 3A:
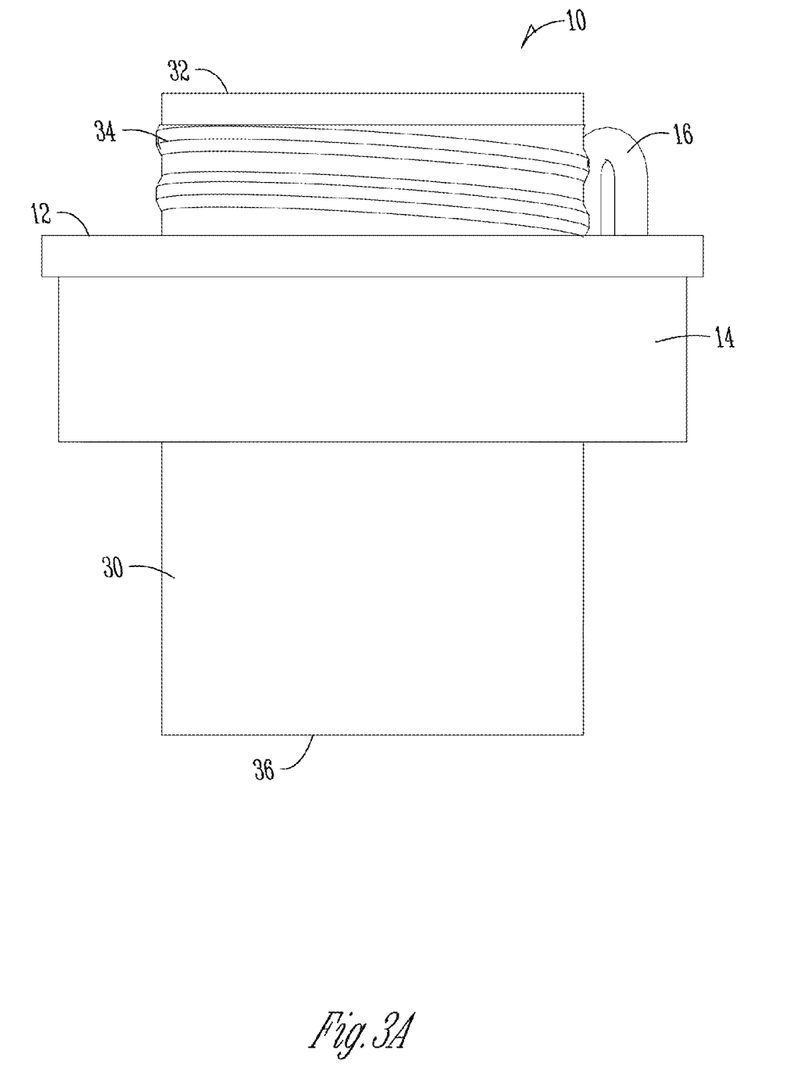
FIGS. 3A and 3B are side views of an embodiment of the drain tube cap without the lid in place, such that the chamber is open.
Figure 3B:
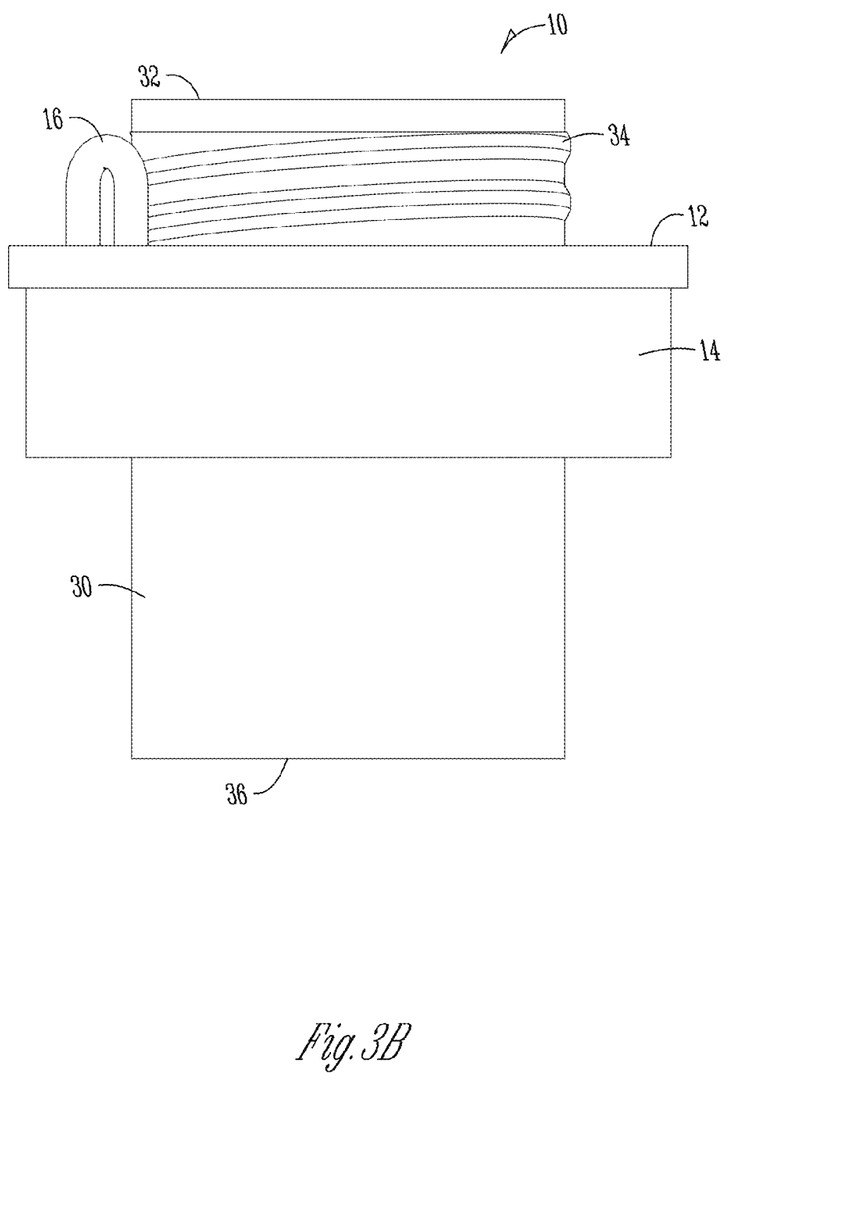
Figure 4:
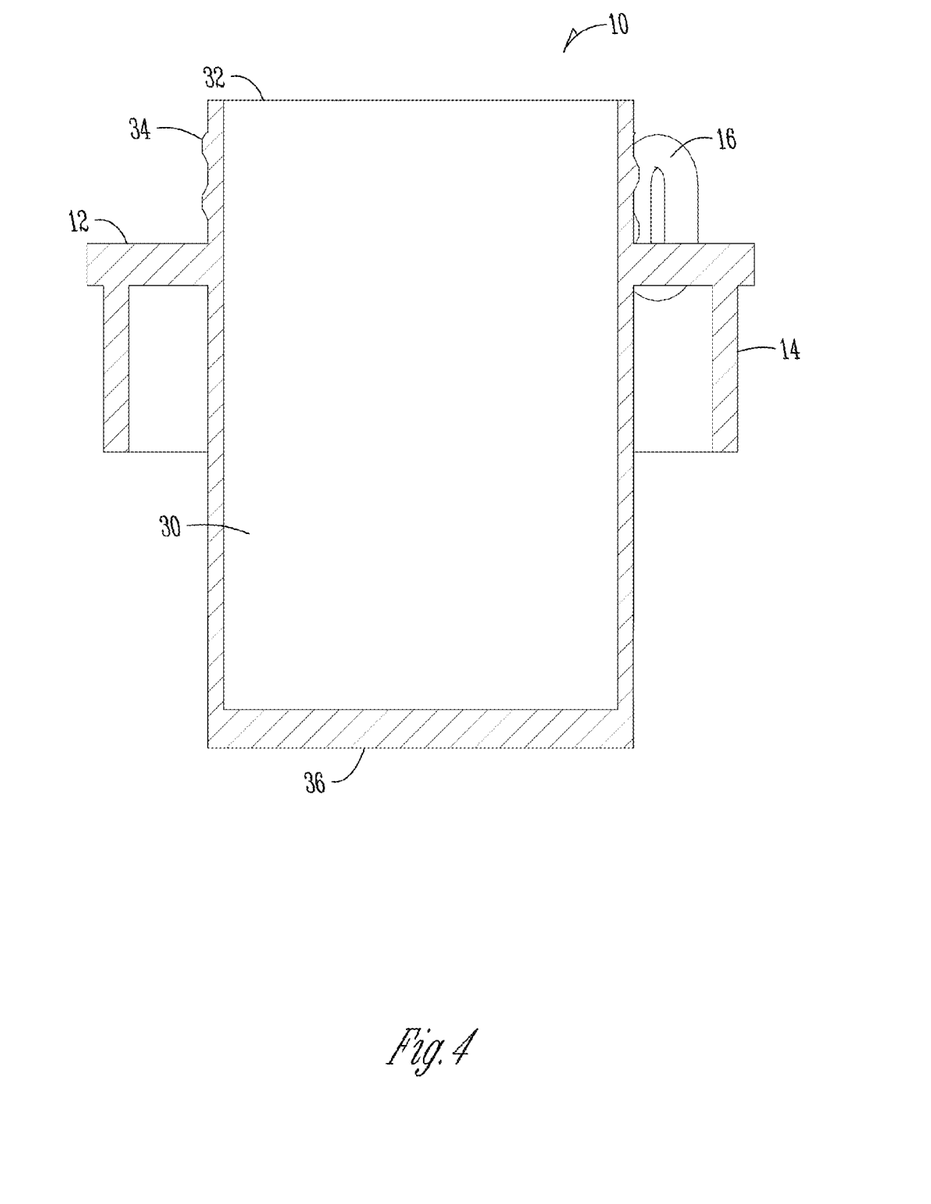
FIG. 4 is a cross-section of a side view of an embodiment of the drain tube cap without the lid in place, such that the chamber is open.
Figure 5:
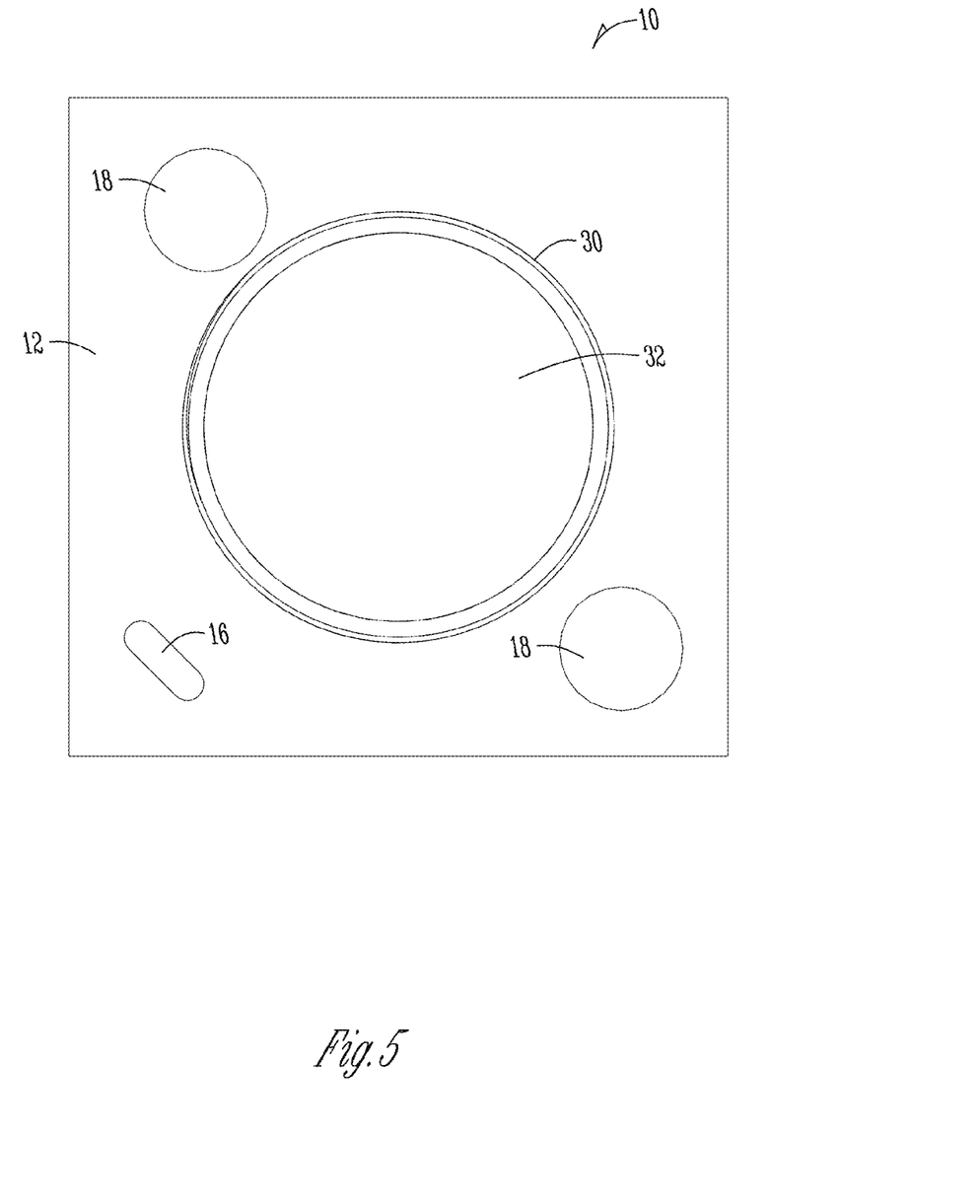
FIG. 5 is a front view of an embodiment of the drain tube cap without the lid in place, such that the chamber is open.
Figure 6:
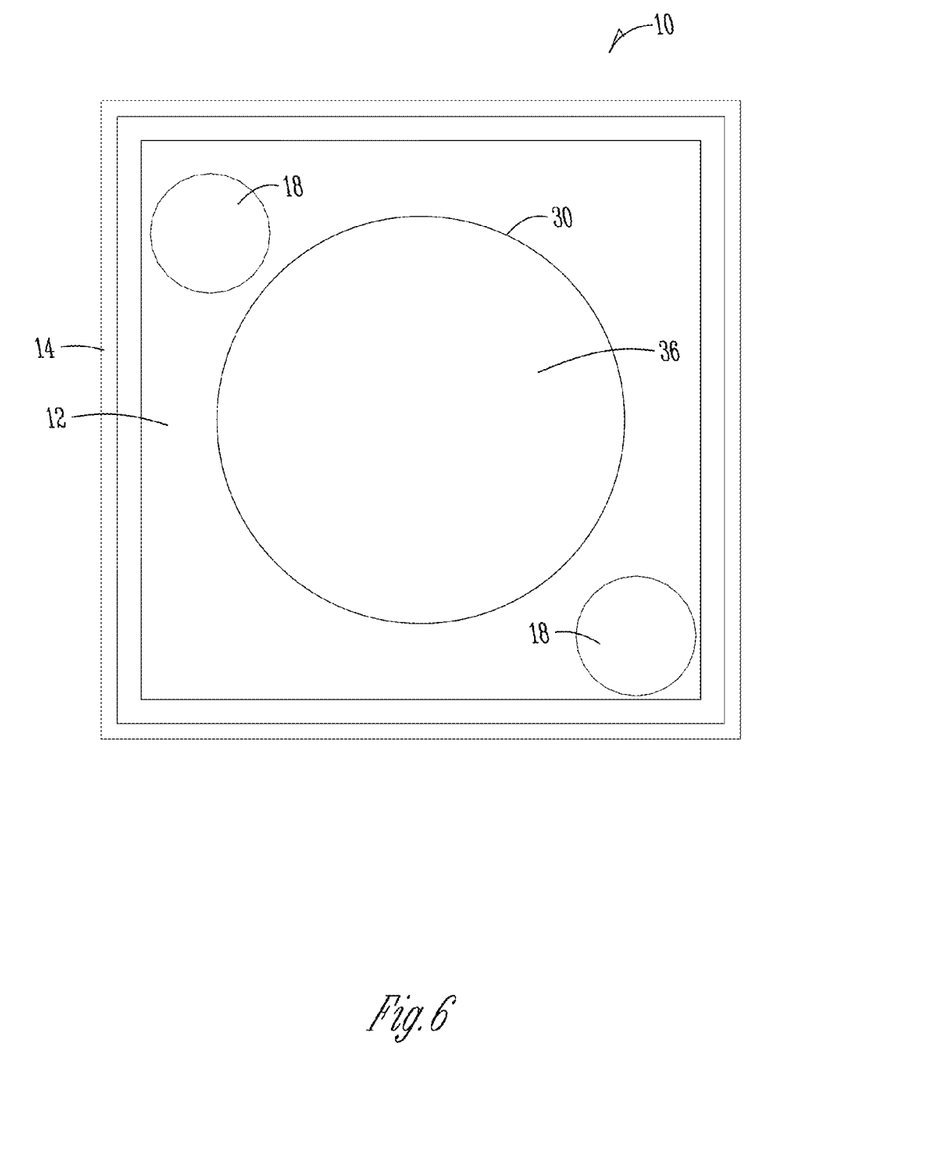
FIG. 6 is a rear view of an embodiment of the drain tube cap.
Figure 7:
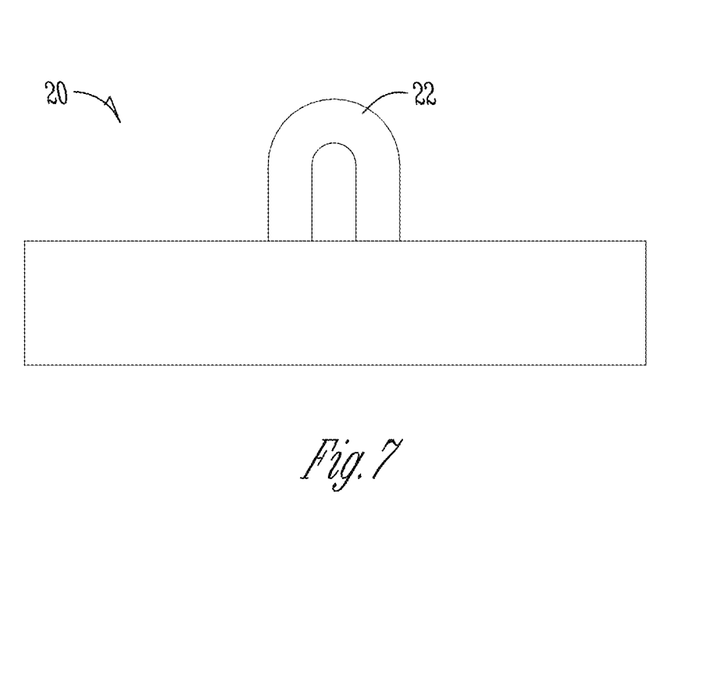
FIG. 7 is a side view of an embodiment of the drain tube cap lid.
Figure 8:
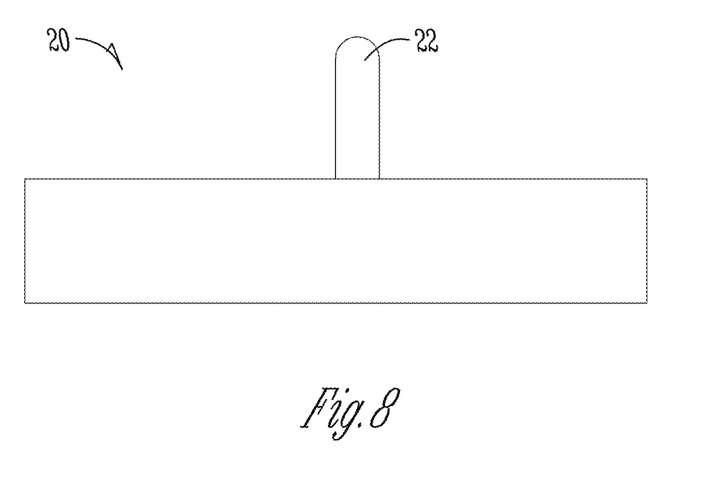
FIG. 8 is a side view of an embodiment of the drain tube cap lid.
Figure 9:
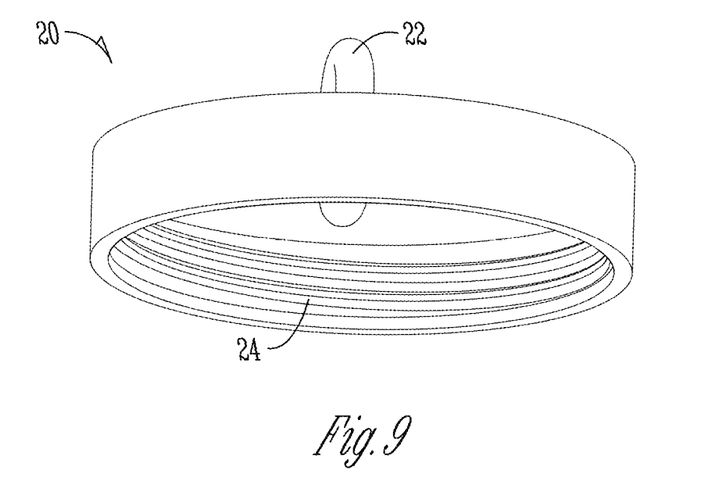
FIG. 9 is a perspective view of an embodiment of the drain tube cap lid.
Figure 10:
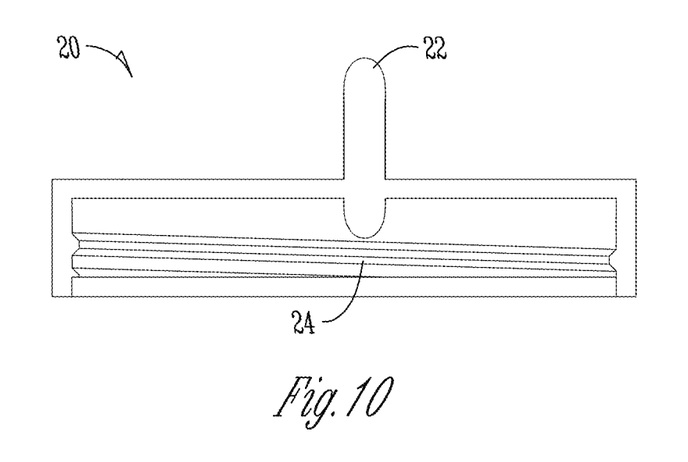
FIG. 10 is a cross-section of a side view of an embodiment of the drain tube cap lid.
Figure 11:
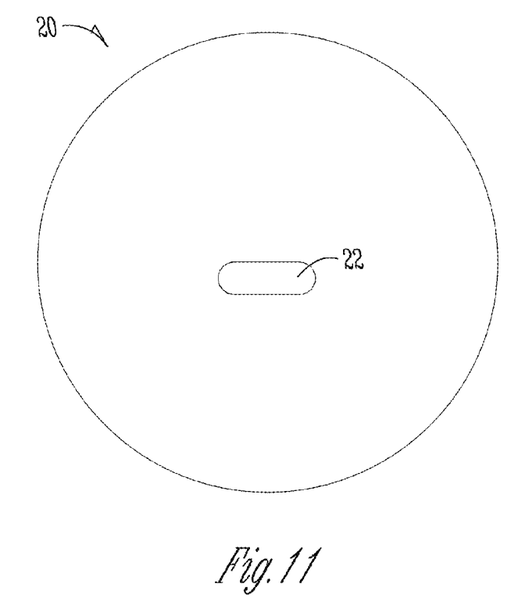
FIG. 11 is a top view of an embodiment of the drain tube cap lid.
Figure 12:
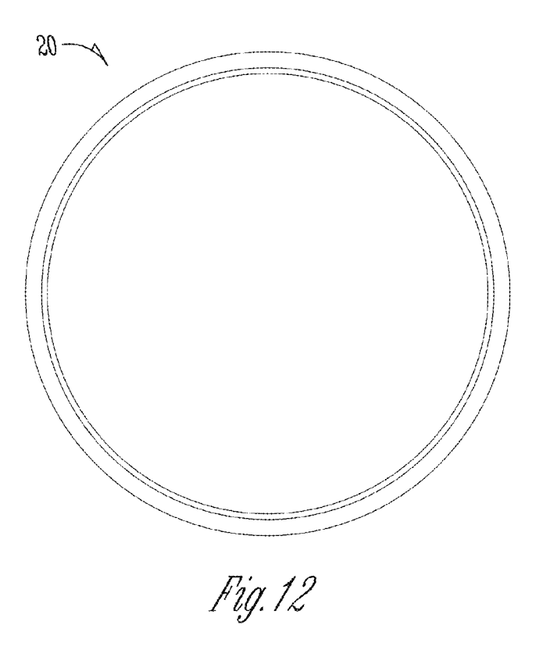
FIG. 12 is a bottom view of an embodiment of the drain tube cap lid.

Referring primarily to FIGS. 7-12, a lid is generally designated by the numeral 20. In a particular configuration of the invention, the lid 20 can be selectively attached to the open end 32 of the chamber 30. The lid may be operably attached to the chamber 30, such that the lid 20 can be moved in a way that the cavity of the chamber 30 is accessible through the open end 32. In a particular configuration, the lid 20 has threading 24. The threading 24 can be on the interior, as shown in FIGS. 9 and 10, or on the exterior of the lid 20. In a configuration where the threading 24 is on the interior of the lid 20, the open end 32 of the chamber 30 has threading 34 on the exterior of a surface extending from the main surface 12, as shown in FIGS. 1-4. In a configuration where the threading 24 is on the exterior of the lid 20, the chamber 30 has threading 34 on the interior of the chamber 30 located near the open end 32.

The drain tube cap 10 may have a member for attaching a linkage 16. According to a configuration, the member for attaching a linkage 16 is located on the main surface 12, as shown in FIGS. 1-5. In an embodiment of the invention, the lid 20 has a member for attaching a linkage 22. The member for attaching the linkage 22 can be attached to any surface of the lid 20. An embodiment of such a configuration is shown in FIGS. 7-11, the member for attaching the linkage 22 is located on the exterior surface of the lid 20. In an embodiment of the invention, a linkage is connected to the member for attaching a linkage 16 on the drain tube cap 10 and the member for attaching a linkage 22 on the lid 20. The linkage can be any suitable linkage for connecting the members for attaching a linkage 16, 22. For example, the linkage can be a rope, string, chain, zip tie, or the like, which allows for the removal of the lid, while keeping the lid at least partially connected to the drain tube cap 10. This can provide additional security measures to aid in the mitigation of losing the lid.

Figure 13:
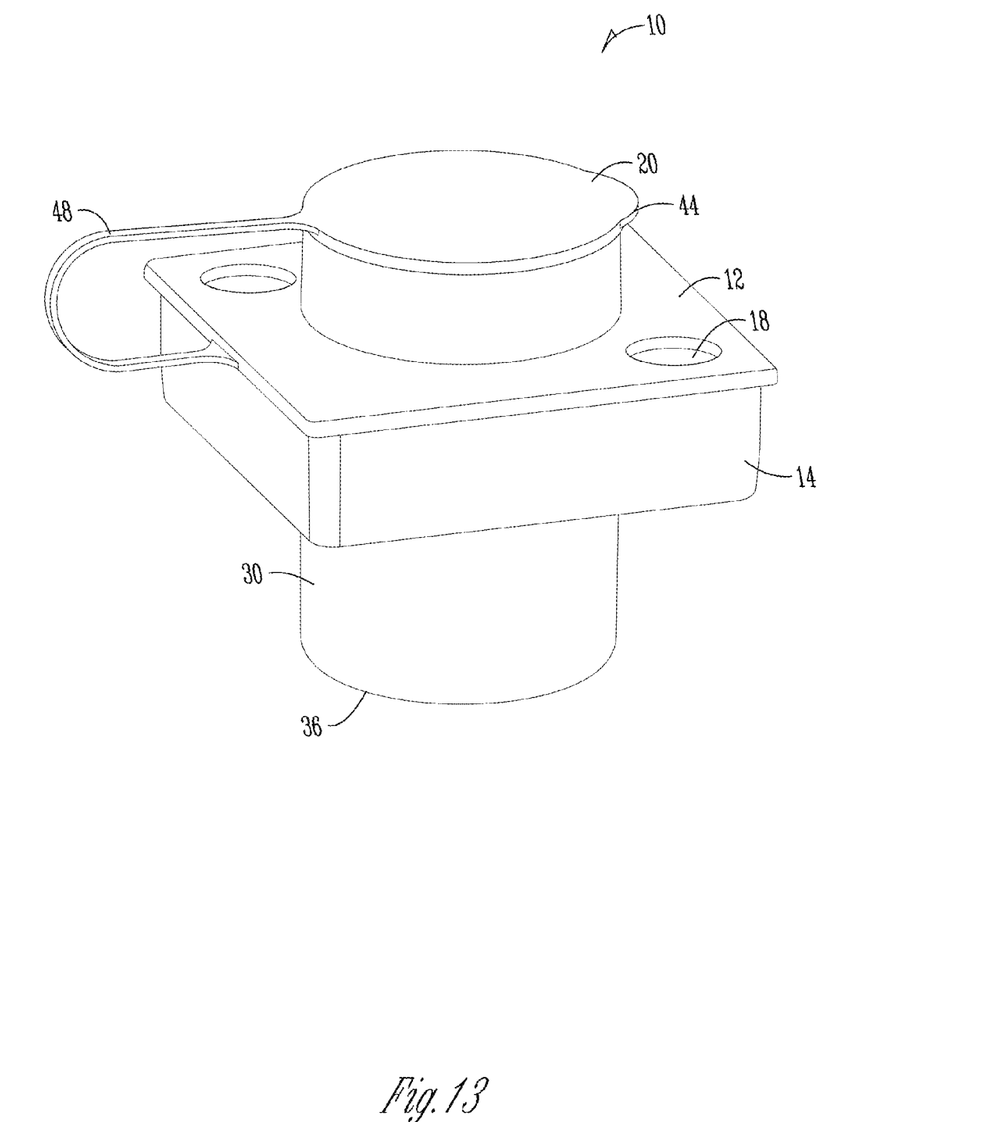
FIG. 13 is a perspective view of an embodiment of the drain tube cap with an integrated lid in place, such that the chamber is closed. The lid is attached to the cap by a tether that is of a single piece with both the lid and the cap.
Figure 14:
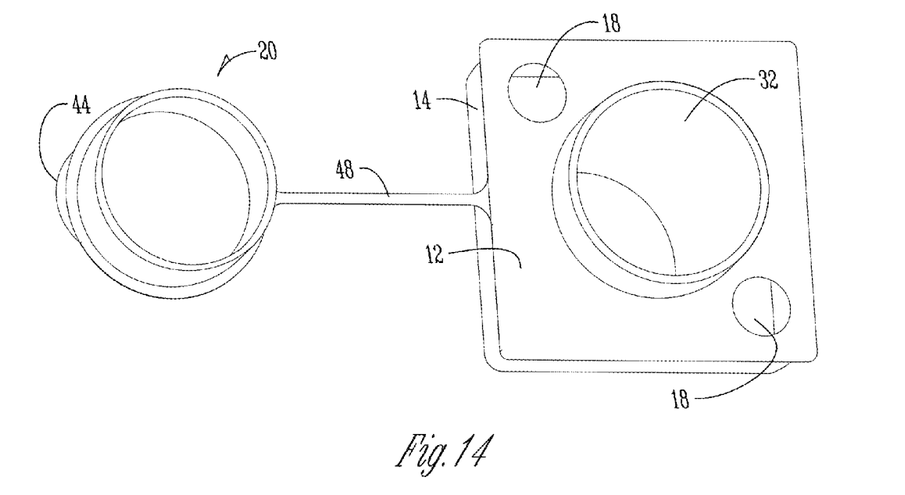
FIG. 14 is a front perspective view of an embodiment of the drain tube cap with integrated lid such that the chamber is open.
Figure 15:
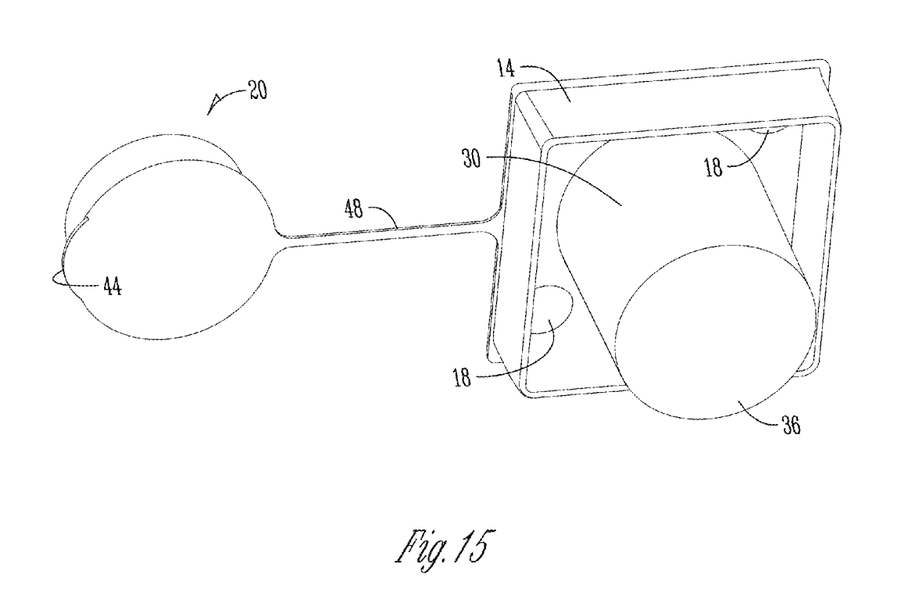
FIG. 15 is a rear perspective view of an embodiment of the drain tube cap with integrated lid such that the chamber is open.
Figure 16:
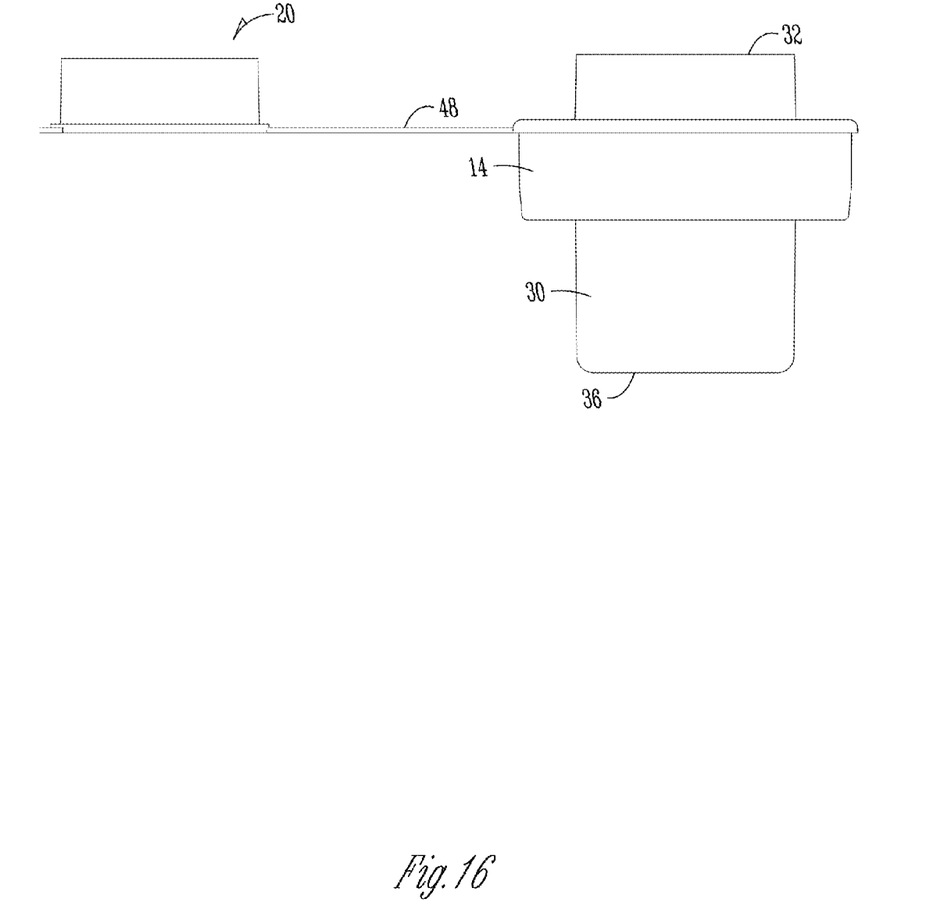
FIG. 16 is a side perspective view of an embodiment of the drain tube cap with integrated lid such that the chamber is open.

Referring to FIGS. 13-15, a preferred embodiment is shown wherein the lid 20 is operably attached to the drain tube cap 10 by a linkage 48. The linkage 48 may be integrated into the cap 20, so that the linkage 48 and cap 20 are of a single piece or unit. The linkage 48 may also be integrated into the main surface 12, or may be integrated into both the cap 20 and the main surface 12. In another embodiment, the linkage may comprise a chain, rope, chord, or similar mechanism attached to both the lid 20 and the drain tube cap 10. The lid 20 may also comprise a grip member 44 allowing the lid 20 to be removed from the drain tube cap 10.

Other variations of the drain tube cap 10 that may be apparent to those skilled in the art are considered to be part of the invention. For example, it is contemplated that the drain tube cap 10 has a grip member. The grip member can be attached or operably connected to the drain tube cap 10 on any external surface to improve grip when removing, replacing, and/or adjusting the position and/or seal of the drain tube cap 10 to the drain tube. Non-limiting, examples of grip members, include, but are not limited to, handles, pegs, grooves, cutouts, apertures, and lips. Those of skill in the art are aware of appropriate grip members. As another example, it is contemplated that the drain tube cap 10 have a locking mechanism. Non-limiting, examples of locking mechanisms, include, but are not limited to, lock and key, combination locks, pad locks, and electronic locks including passcodes, radio frequencies, blue-tooth connection, etc. Those of skill in the art are aware of appropriate locking mechanisms.

The drain tube cap 10 may be made of any suitable composition. Non-limiting, examples, of compositions that the drain tube cap 10 can be made of include, but are not limited to, plastics, composites, metals, resins, etc. The drain tube cap 10 can be made by any suitable process, including, but not limited to, injection molding, 3D printing, welding, pressing, etc. Those of skill in the art are aware of appropriate compositions for and methods of manufacturing the drain tube cap 10.

Other alternative embodiments obvious to those in the field of the art are considered to be included in this invention. This description is merely exemplary of certain embodiments, and limitations of the invention are not limited to the application.

What is claimed is:

1. A drain tube cap comprising:
    a main surface, wherein said main surface is rectangular;
    a sealing member, wherein said sealing member is rectangular;
    a chamber having an open end and a closed end, wherein said open end of said chamber is oriented at or near said main surface, and wherein said closed end of said chamber extends rearward from said main surface;
    a lid operatively attached at said open end; and
    wherein said chamber of the drain tube cap is configured to removably store one or more items, and wherein said drain tube cap is configured to fit into a compartment on a vehicle.

2. The drain tube cap of claim 1, wherein said surface has at least one aperture.

3. The drain tube cap of claim 2, wherein said at least one aperture further comprises a screen, mesh, perforations, or bars configured to provide venting through said at least one aperture.

4. The drain tube cap of claim 2, wherein said apertures are positioned so as to provide improved grip.

5. The drain tube cap of claim 1, wherein a member for attaching a linkage is affixed to the surface and wherein a member for attaching a linkage is affixed to the lid.

6. The drain tube cap of claim 5, further comprising a linkage having two ends, wherein the first end of said linkage is attached to the member for attaching a linkage on the surface, and said second end of said linkage is attached to the member of attaching a linkage on the lid.

7. The drain tube cap of claim 1, further comprising a linkage configured to operatively attach said lid and said main surface.

8. The drain tube cap of claim 7, wherein said linkage is integrated into said lid and/or into said main surface.

9. The drain tube cap of claim 1, wherein said sealing member is ribbed, grooved, tapered, or a combination thereof.

10. The drain tube cap of claim 1, wherein the one or more items includes disposable gloves, keys, tools, or some combination thereof.

11. The drain tube cap of claim 1, wherein said open end extends forward from the surface.

12. The drain tube cap of claim 1, wherein said open end is threaded and wherein said lid is threaded, so as to seal the open end of the chamber.

13. The drain tube cap of claim 1, wherein said chamber is rectangular or cylindrical.

14. The drain tube cap of claim 13, wherein said sewage drain tube is located in the vehicle compartment.

15. The drain tube cap of claim 1, wherein said lid further comprises a grip member.

16. A cap for a compartment located on a vehicle, said cap consisting of:
    a main surface comprising at least one aperture, wherein said main surface is rectangular;
    a storage chamber having an open end and an opposing closed end, wherein said open end of said chamber is oriented at or near said main surface;
    a lid configured to be selectively attached to said open end of said storage chamber; and
    a linkage configured to operatively attach said lid to said main surface
    wherein said storage chamber extends through said main surface in a direction generally perpendicular to said main surface; and
    wherein said cap is configured to fit into a vehicle compartment that houses a sewage drain tube, and wherein said storage chamber is configured to removably store one or more items.

17. The drain tube cap of claim 16 wherein said main surface has at least two apertures.

18. The drain tube cap of claim 16 wherein said lid further consists of a grip member.

19. The drain tube cap of claim 16, wherein said sealing member is ribbed, grooved, tapered, or a combination thereof.

20. A storage chamber within a drain tube cap for a vehicle comprising:
    a main surface extending outward along a generally horizontal plane, said main surface comprising at least one aperture, wherein said main surface is rectangular;
    a chamber extending through the main surface, said chamber having an open end and a closed end;
    wherein said open end of said chamber is proximate said main surface, and wherein said chamber extends rearward in a generally perpendicular direction from said horizontal plane of said main surface;
    a lid comprising a grip member, wherein said lid is configured to be selectively attached to said open end of said chamber via said grip member;

a linkage operatively attached to said lid and operatively attached to said main surface;

a sealing member configured to affix said drain tube cap to said vehicle, wherein said sealing member is rectangular and ribbed, grooved, tapered, or a combination thereof; and wherein the vehicle comprises a compartment where a sewage drain tube is located, and wherein the drain tube cap is configured to fit into the vehicle compartment, and wherein said chamber is configured to removably store one or more items.

\* \* \* \* \*